United States Patent Office 3,719,056
Patented Mar. 6, 1973

3,719,056
METHOD AND APPARATUS FOR CONTROLLING FREEZERS
Walter L. Hock, Skokie, Ill., and Abraham Simon, Havertown, Pa., assignors to Kraftco Corporation, New York, N.Y.
Filed Nov. 17, 1971, Ser. No. 199,634
Int. Cl. F25c 7/10
U.S. Cl. 62—70                                    22 Claims

ABSTRACT OF THE DISCLOSURE

A method and apparatus are provided to permit quick stopping and subsequent restarting of freezers while preserving the immediate usability of the product being frozen. The stopping and the restarting of the freezers is related to the stiffness of the mix being frozen. In freezers having a plurality of freezing tubes, accommodation is made for the stopping and restarting according to the individual requirements of the mix in each separate tube.

---

The present invention relates generally to a method and apparatus for controlling freezer equipment and more particularly, relates to a method and apparatus which provide quick stopping and the subsequent restarting of freezer equipment while preserving the immediate usability of the product being frozen.

In the manufacture of frozen deserts, such as ice cream, sherbert, and ice milk, it has been the practice to continuously operate the freezer apparatus during a given production run. If a failure occurs on the packaging line or elsewhere during the run, the freezer apparatus continues to produce more of the frozen product. The product produced during this period of failure is separately collected and thereafter returned to the manufacturing process as "rework" product. This procedure, of course, is uneconomical in that the rework product must be returned to the starting point in the process and be refrozen. Not only is this procedure undesirable because of the additional costs incurred, it is also undesirable because the product may be one in which a change in flavor would result from the rework. Further, if the rework product is ice cream that contains particulate material, such as fruit, nuts or candies, the particulate material must be strained from the rework product prior to the returning of the product to the manufacturing process.

Merely stopping the freezer to discontinue the production of the frozen product when there is a malfunction in the packaging line presents a further problem. When the freezer is stopped, the mix within the freezer tube stiffens and the start-up of the freezer thereafter is at best difficult and sometimes impossible until the stiffness has been decreased by partial thawing. The partially thawed product that is then removed from the freezer is not usable in that immediate condition and must also be reworked. Consequently, when a brief malfunction in the packaging line has occurred, it generally has been considered the lesser of two undesirables to continue the production of the frozen product, to separately collect the continued product, and to rework the separately collected product rather than stop the freezer.

In a co-pending application, Ser. No. 855,985 entitled "Method and Apparatus for Stopping Ice Cream Freezers," filed Sept. 8, 1969, now Pat. No. 3,608,325, issued Sept. 28, 1971 there is set forth a method and apparatus for the instant stopping of an ice cream freezing line during a production run without blocking the ice cream freezer with hardened ice cream. The stopping occurs without rendering the ice cream within the freezer tube unusable. The pumps and refrigerant are stopped substantially simultaneously while the dasher continues to agitate the mix within the freezer tube. The dasher motor is operable long enough thereafter to maintain a desirable texture of the ice cream contained in the freezer tube during residual freezing while the inner surface of the freezer tube is kept free of the ice cream, but not so long that the dasher agitation causes the ice cream to become unusable by acquiring an undesirable texture. A predetermined time delay in idling the dasher affords the foregoing.

In another co-pending application, Ser. No. 102,284 entitled "Control System for Freezers," filed Dec. 29, 1970, there is set forth an improved control system for freezing devices of the type having hot refrigerant gas from the refrigeration system automatically injected into the freezer tube upon shut-down so as to instantly warm the contents of the freezer tube and prevent undesirable freeze-up of the mix. The improvement is particularly applicable to freezers of the hot gas type that use a common motor drive for the dasher and the mix pump, where there is a tendency to produce soft and unusable ice cream when the freezer system is restarted after a shut-down.

Both of these inventions provide for the stopping of the freezers by merely pushing a button. Such is desirable since a control panel then can be located at the filler or packaging line to enable quick stopping of the freezer when a jam-up or other failure along the packaging line occurs, a primary object being to minimize the time between a jam-up and the stopping of the freezer, and, hence, the amount of rework product.

Many freezers contain a bank or plurality of freezer tubes in their system. During a given production run, these tubes may not all have the same type of mix being frozen therein. Accordingly, at any given instant the condition of a mix within a particular freezer tube may be different from that within another tube of the same freezer system. Further, inherent differences exist in the equipment itself. Hence, it is desirable to control the instant stopping and restarting of such a freezer system in accordance with the individual requirements of each freezer tube and type of mix being frozen therein.

It is an object of the present invention to provide a method and apparatus for the quick stopping and subsequent restarting of freezers in response to the stiffness of the mix being frozen.

It is another object of the present invention to provide a method and apparatus for minimizing rework product during the manufacturing process in a freezer system having a plurality of freezer tubes.

It is a further object of the present invention to provide a method and appaartus for controlling from a central station the quick stopping and subsequent restarting schedule of a freezer having a plurality of freezer tubes in its system.

It is yet another object of the present invention to provide a method and apparatus for the quick stopping and subsequent restarting of a freezer having a plurality of freezer tubes according to the conditions of each tube and of the mix being frozen within each tube.

These and other objects of the present invention will become more apparent from the following detailed description and in the accompanying drawings, wherein.

In general, the method and apparatus of the present invention are used in combination with an ice cream manufacturing line. Although the description hereinafter will generally refer to the product as ice ceam, it should be understood that the method and apparatus of the present invention are equally useful in the manufacture of sherbert, ice milk, and other frozen desert products.

Figure 1:
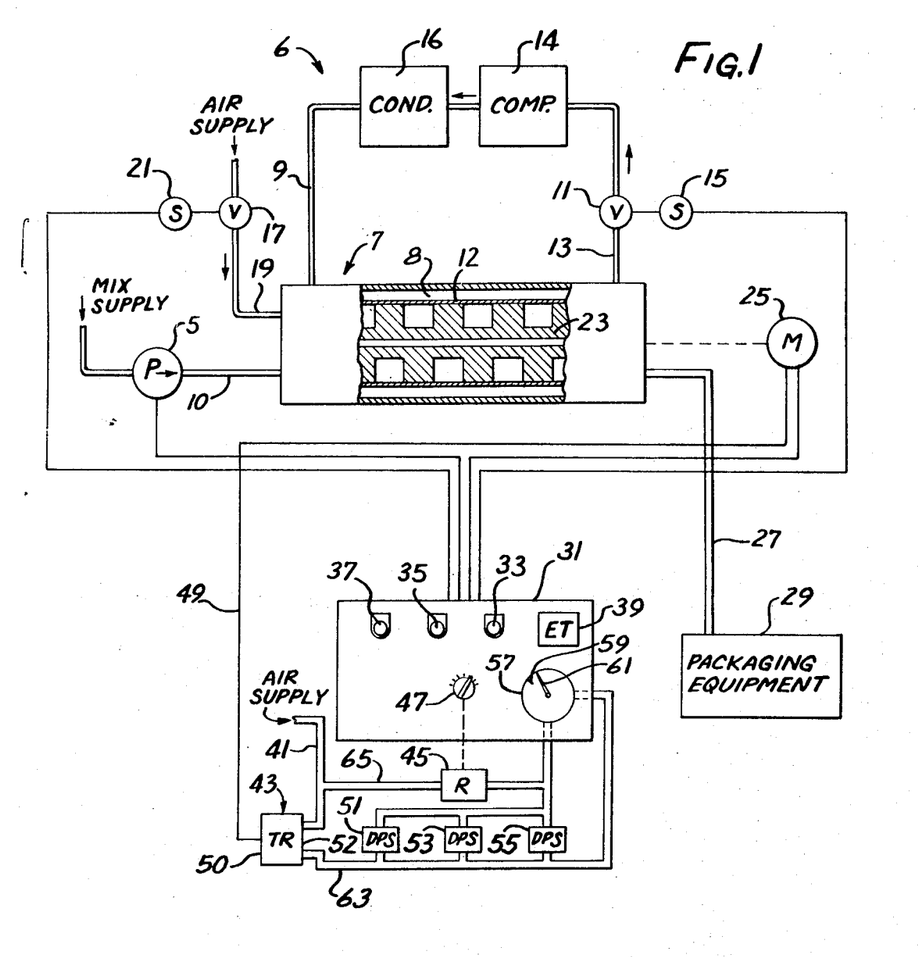
FIG. 1 is a schematic illustration of a product freezer showing only the principal parts of the freezer and depicting various of the features of the present invention.

Briefly referring to FIG. 1, a freeze 6 includes a compressor 14, a condenser 16, a freezer cylinder or tube 7 for congealing a product mix supplied thereto, a motor-driven pump 5 for moving the mix through the freezer, a dasher 23 driven by a motor 25 for agitating the mix within the freezer tube, an air solenoid valve 17, a refrigerant solenoid valve 11 and an electrical control circuit for controlling these components.

A conventional system is utilized in the freezer in which a refrigerant, such as ammonia, ethyl chloride or Freon, circulates. In the refrigeration system the refrigerant in the gaseous or vapor form is compressed and then condensed to a liquid state. Heat is given up at the condenser 16. The liquid refrigerant then circulates to the freezer tube 7 where the pressure of the liquid refrigerant is reduced and the refrigerant evaporates or boils and returns to the vapor state, absorbing heat while it does so. This heat is extracted from the surface of the freezer tube in which the product mix is being agitated by the dasher 23 to assure uniform freezing. Heat from the mix is transferred to the surface, thus cooling and congealing the mix. In response to the positive pressure of the pump 5, the congealed product moves out of the freezer tube to packing equipment 29. A valve 11 in the refrigerant line is used to control the flow of refrigerant within the line. When the refrigerant flow is stopped, the cooling of the product mix in the freezer tube gradually decreases as the residual effect of the refrigerant in the tube diminishes.

If the dasher is stopped simultaneously with the stopping of the refrigerant flow, the ice cream within the freezing tube will become hardened, making it difficult and in some instances impossible to restart the dasher. On the other hand, if the dasher runs too long the ice cream in the tube will acquire an undesirable texture and become unsuable. The control circuit, hereinafter described in detail, permits the freezer to be quickly stopped and subsequently restarted without either extreme condition occurring to the ice cream within the tube, thus preserving the immediate usefulness of the ice cream. Further, where more than one freezer tube is employed in a single refrigeration system, the control circuit will respond to the individual requirements of the tubes, i.e. the different state, condition, or stiffness of the mixes themselves and as affected by the tubes at the time of either stopping or starting. Only one central control need be used. As is described in detail, hereinafter, the points at which the dashers stop and the pumps stop and restart in the respective stopping and restarting schedules are adjustable for each freezer tube in the single system.

Referring now more particularly to FIG. 1 (ice cream mix is drawn by the freezer pump 5 from a batch storage (not shown) and is fed into the freezer tube 7 by means of a mix line 10. Liquid refrigerant is introduced into a hollow shell 8 surrounding an inside wall 12 of the freezer tube 7 through a line 9 and exits as a vapor from the hollow shell through a valve 11 by means of a line 13. The valve 11 is opened by a solenoid 15. A spring in the valve urges the valve closed when the solenoid 15 is de-energized. Air is introduced into the ice cream mix through a valve 17 by means of an air line 19. The valve 17 is opened by a solenoid 21. A spring in the valve 17 urges the valve closed when the solenoid 21 is de-energized. The air is fed at predetermined levels into the ice cream to provide a desired level of overrun in the ice cream.

The freezer tube 7 further comprises a dasher 23, which is driven by a dasher motor 25. The dasher 23 agitates the ice cream mix and scrapes ice cream from the inside wall 12 of the freezer tube 7 as the ice cream forms to facilitate heat transfer and to incorporate air in the ice cream. The ice cream exits from the freezer tube 7 and is fed to the packaging equipment 29 by means of a line 27. Particulate material, such as fruit, nuts, and candies, may be added to the ice cream as it exits from the freezer tube from a suitable source (not shown).

As indicated previously, it is often the practice in the ice cream industry to continuously operate the freezer 6 after a production run has been started. If a temporary malfunction occurs in the packaging equipment 29 or elsewhere, the ice cream is diverted to separate containers (not shown). The containers of this diverted ice cream are then stored until rework can be effected. Rework is accomplished by introducing the ice cream back into the mix line ahead of the freezer tube. If the ice cream to be reworked contains particulate material, this material must first be strained from the ice cream prior to introduction of the rework ice cream at the beginning of the production line.

As shown in FIG. 1, each of the solenoids 15, 21, the pump 5, and the dasher motor 25 are connected electrically to a control panel 31. The control panel 31 contains the electrical circuitry and components for the control of the freezer 6, which will be described in detail hereinafter in connection with FIG. 2.

It has been discovered that a proper sequence of closing the valves and stopping the pump and dasher motor with suitable intervening time intervals when stopping the freezer will prevent the ice cream contained in the freezer from becoming unusable or undesirably hardened. Similarly, a proper sequence with suitable intervals of opening and restarting these components when restarting the freezer will prevent soft ice cream from being fed to the packaging line. Thus, by appropriately controlling the stopping and restarting of the freezer 6, a production run may be temporarily interrupted without having to remove the ice cream that is produced from the packaging equipment just prior to and just subsequent to the interruption. If, however, a sustained shut down is experienced, it may be desirable to rework the ice cream that is fed from the freezer tube subsequent to restarting the production run. For this reason, the control panel 31 includes an elapsed time meter 39 to indicate the length of time the line is stopped so that a decision can be made whether to rework the ice cream that was in the lines at the time of shut down. The elapsed time meter begins timing immediately upon stopping and stops timing upon restarting. The time interval is indicated on the meter. It is manually reset after the elapsed time has been observed.

Figure 3:
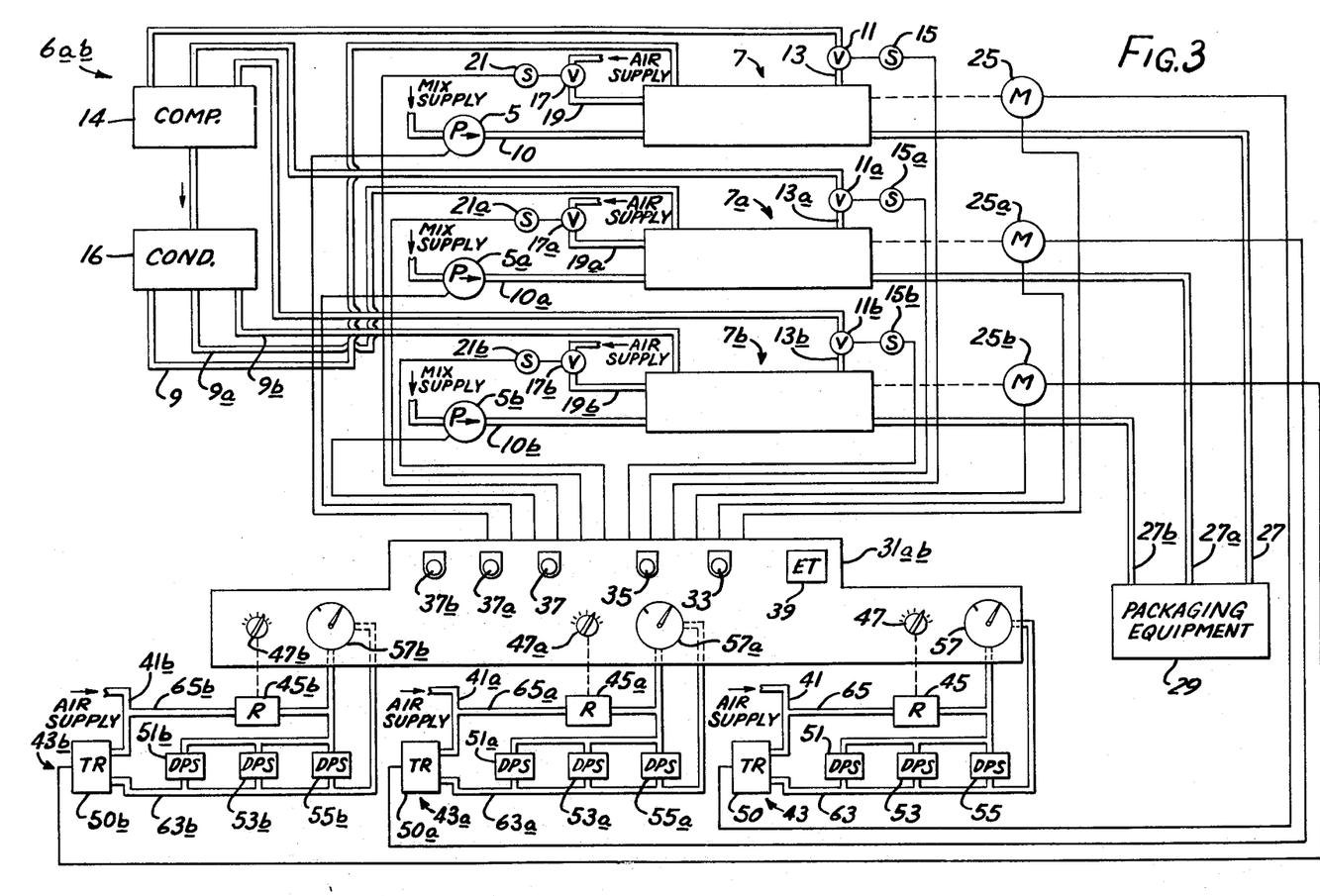
FIG. 3 is a schematic illustration depicting various features of the present invention in a single freezer system employing a plurality of freezer tubes.

Various features of the invention are particularly useful not only for a single freezer system having a single freezer tube, such as depicted in FIG. 1, but also in a single freezer system having a plurality of freezer tubes, such as depicted in FIG. 3. For ease of illustration, however, the description of the present invention mostly will be confined to the freezer having a single freezer tube.

Referring again to FIG. 1, a stop switch 33, which may be of the momentary push button type, is located on the control panel 31. This panel can be mounted near the packaging equipment. If it is, the proximity of the control panel to the packaging equipment permits immediate stopping of the freezer when a jam-up or other problem occurs in the packaging equipment. By reducing the time interval between a jam-up and the stopping of the freezer, the amount of rework ice cream is minimized. In this connection, it is desirable to have the schedule of shut down proceed by the mere activation of a single switch, which, in the present instance, is accomplished at the switch 33.

When the stop switch 33 is actuated, the following general sequence occurs: (a) the elapsed time meter 39 is started and the solenoid 15 is deenergized to permit the closing of the refrigerant valve 11; (b) the freezer pump 5 is stopped and the solenoid 21 is deenergized to close the air valve 17; and (c) the dasher motor 25 is stopped. Time intervals occur between the steps of the aforementioned sequence, as will be described hereinafter. The time interval between (b) and (c) permits the dasher 23 to scrape ice cream from the surface of the inside wall 12 of the freezer tube 7 until the residual cooling of the refrigerant contained in the hollow shell 8 has been utilized. The valve 11 is positioned in the vapor return line of the refrigeration system. The closing of the valve 11 stops the flow of the refrigerant as pressures in the line equalize. No further liquid refrigerant is introduced into the hollow shell 8 after the valve is closed. If the dasher motor 25 were to stop simultaneously with the stopping of the refrigerant flow, residual cooling of the refrigerant contained in the hollow shell would freeze the ice cream and prevent the dasher 23 from restarting, or at least make it difficult to restart. The time interval cannot be arbitrary, however, or difficulty may be encountered. If the time interval is too long, the continued dasher action causes the ice cream contained in the freezer tube to acquire an undesirable texture, and the packages of ice cream which are filled immediately after the restarting are unusable. On the one hand, if the time is too short, the ice cream hardens and interferes with the subsequent restarting of the apparatus.

To resolve the difficulty noted above, provision is made for the time interval to be related to the dasher motor load current. When mix is newly introduced in the freezer tube, the load on the dasher motor is less than when the mix is in the process of congealing. Conversely, when a production run is in process, under normal freezer conditions the load on the dasher motor is at its normal full load. After the refrigerant flow is stopped and the residual cooling in the tube has diminished, the load on the dasher motor 25 begins to decrease as the mix softens. Since the line current draw of the motor follows the load of the motor, i.e. increases as the load increases and decreases as the load decreases, the motor current is related to the consistency of the mix. The ingredients that constitute a particular ice cream mix may affect the time in which that mix will reach a desired consistency in the freezer tube. Further, conditions of the refrigerant side of the tube itself may affect the conditions of the mix. Thus, if a time delay means is used to determine the time interval, it is desirable that the time delay means be adjustable. The time can then be predetermined and set for a particular mix.

If, as in the present instance, the time interval is related to the load current of the dasher motor, a given point of ice cream consistency at which the dasher motor is stopped is accurately and repeatedly achievable with need for little empirical data. It is a further feature of the present invention to provide an adjustment by which different points of ice cream consistency can be selected, thus adding flexibility to the control.

This selection is accomplished, in the present instance, by means of a reference or a standard to which the dasher motor load current is compared. In the preferred embodiment of the present invention, the device that does this comparing is in the form of a pneumatic circuit employing differential pressure switches. Referring again to FIG. 1, air of approximately 20 p.s.i. is fed through an air line 41 from a suitable air supply (not shown) to the output side 52 of a transducer 43 and to a regulator 45. By means of a knob 47 on the control panel 31, the regulator 45 is adjustable and is used to set the reference for the load cut-in, i.e. the point of ice cream consistency or stiffness at which certain electrical components stop and start the pump and stop the dasher, as will be described in detail hereinafter.

Three separate signals are contemplated by the preferred embodiment. One signal each originates from the differential pressure switches 51, 53 and 55. These may be conventional differential pressure switches. The switches have contacts in the electrical circuit, which will be seen in connection with the description of FIG. 2. A meter 57 on the control panel 31 has a small needle 59, movable around the periphery of the meter, that responds to the setting of the adjustment knob 47 of the regulator 45. Thus, the needle 59 will indicate the load cut-in point selected. A needle 61 on the meter 57 responds directly to the load current of the dasher motor 25. The meter may be of the conventional pneumatic type. Its scale may be calibrated in units of one to one hundred, for purposes of reference indicia only. In this instance, the units do not represent specific quantities of current or air pressure.

The pneumatic circuit receives an output from the transducer 43 in proportion to the magnitude of an electrical input from the dasher motor 25 by means of an electrical line 49 connected to the input 50 of the transducer. The electrical input 50 of the transducer 43 is converted to an air pressure on the output 52.

The pneumatic circuit has two primary branches. As viewed in FIG. 1, the lower branch 63 is common to one side of each of the differential switches 51, 53, 55 and one side of the meter 57. The upper branch 65 is connected to the air supply and to the other side of each of the differential pressure switches and the meter through the regulator 45. The air pressure in upper branch is responsive to the setting of the regulator 45. The pressure in the lower branch is responsive to the output of the transducer, which in turn is proportionate to the magnitude of the load current of the dasher motor 25.

Each differential pressure switch has a diaphragm which is in a neutral position when the air pressure on each side of it is equalized. Such equalization occurs when the load current on the motor is of the magnitude equal to the reference setting of the regulator in the upper branch. The construction of the differential pressure switch is such that when the diaphragm is in equilibrium or beyond equilibrium in the direction of the contacts, the electrical contacts are closed, and when the diaphragm is displaced from neutral in the other direction, the contacts are open. An adjustable spring is connected to one side of the diaphragm to place a bias on it. Thus, each differential pressure switch is adjustable independently of the others for a load air pressure at which its diaphragm will be at neutral at a given reference setting. Thus, the differential pressure switches in a given pneumatic circuit can each be adjusted initially to always have slightly different neutral points from one another for a given reference. When the regulator 45 is adjusted by the knob 47, the reference of the differential pressure switches is adjusted accordingly. Operating differences between the switches resulting from the initial settings of the bias springs remain constant. The range in which these differences operate is altered by the reference setting.

Figure 4:
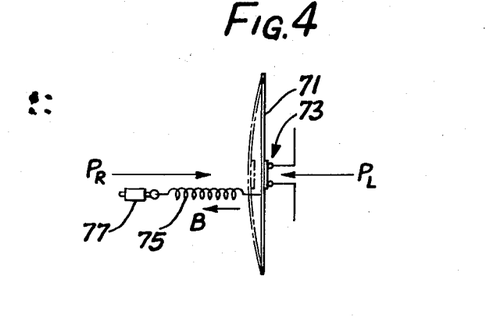
FIG. 4 is a schematic illustration of a differential pressure switch used in the apparatus of FIGS. 1 and 3.

The operation of the diaphragm of the differential pressure switch is illustrated schematically in FIG. 4. The solid vertical line represents a diaphragm 71 in the normal or equilibrium position. In this position, the diaphragm closes a set of electrical contacts 73. The directions of the forces acting upon the diaphragm are represented by the arrows $P_R$, $P_L$, and B. The reference pressure $P_R$ tends to close the contacts, whereas the load pressure $P_L$ and the bias spring pressure B tend to displace the diaphragm 71 from the neutral position and open the contacts, this condition being illustrated in phantom. The bias spring 75 is adjustable by a spring adjusting means 77. With no bias, the diaphragm 71 is at equilibrium when $P_L$ equals $P_R$. To the extent that a bias exists, the quantity represented by the magnitude of the bias is added to $P_L$. Hence, for a given setting of $P_R$, $P_L$ (load) must decrease an amount equal to the bais before equilibrium of the diaphragm 71 will be achieved and the contacts 73 closed. In this example, the sides of the diaphragm on which the reference pressure $P_R$ and the load pressure $P_L$ appear is arbitrary. The pressures may be applied in the reverse manner. This in fact occurs in the instance of the differential pressure switch 53, the operation of which will be hereinafter described in connection with the start-up of the freezer.

The differential pressure switch 51 controls the stopping of the pump 5 and the closing of the air valve 17. The differential pressure switch 53 controls the starting of the pump 5 and the opening of the air valve 17. The differential pressure switch 55 controls the stopping of the dasher motor 25. The starting of the dasher motor 25 occurs by the actuation of a start switch 37, which like the stop switch 33 may be of the momentary push button type. As will be seen hereinafter in the description of the operation, a start switch 35, which also may be of the momentary pushbutton type, is used to initiate the automatic start sequence.

The refrigeration system of the freezer 6 in FIG. 1 comprises a compressor 14 in which the vapor of the refrigerant is compressed to an increased pressure; a condenser 16 in which the compressed vapor of the refrigerant is condensed to a liquid and gives up its heat; a freezer tube 7 where the liquid carried to it in the line 9 expands to a reduced pressure, evaporates and removes heat from the freezer tube while evaporating; and a gas line valve 11.

More particularly, during the freezing of a given mix in the freezer tube 7, the freezing can be interrupted and the freezer stopped by a single actuation of the stop switch 33. This actuation immediately starts the elapsed time meter 39. The aforementioned control apparatus then progresses in the orderly stopping of the equipment, according to a predetermined schedule. Part of this predetermined schedule involves the adjusting of the bias springs in the differential pressure switches, particularly the switches 51, 55. Preferably, the pump 5 should shut down ahead of the dasher motor 25. Thus, the biasing of the differential pressure switch 51, which controls the stopping of the pump motor and the closing of the mix air solenoid 17 will be adjusted so that at any given setting of the regulator 45, the pump will stop ahead of the dasher motor.

Another portion of the predetermined schedule is the setting of the regulator 45 by the control knob 47 on the control panel 31. As mentioned previously, while the regulator 45 is being adjusted, the indicating needle 59 responds by a movement along a circular path on the periphery of the dial of the meter 57. The adjusting of the regulator 45 and the needle 45 responsive thereto sets the load cut-in point. As will be seen hereinafter in connection with a single freezer system having a plurality of freezer tubes, the load cut-in or reference point can be adjusted separately for each freezer tube at the control panel.

A further portion of the predetermined schedule is found in certain of the components that constitute the electrical control circuit. In addition to starting the elapsed time meter 39 when the stop switch 33 is actuated, the spring actuated gas valve 11 is allowed to close, which stops the flow of the refrigerant in the refrigeration system and in particular prevents further liquid refrigerant from entering the hollow cylinder 8 of the freezer tube 7 from the line 9. Thus, only the residual cooling caused by the refrigerant already in the hollow cylinder will continue to affect the ice cream mix in the freezer tube. As the cooling diminishes, the temperature of the inside wall 12 of the freezer tube begins to gradually increase. As it does so, the stiffness of the mix begins to decrease and the load on the dasher motor 25 begins to decrease correspondingly. The magnitude of the motor load is an applied stimulus which is converted by the transducer 43 into an air pressure proportionate to the applied stimulus. Thus, as the motor load decreases, the air pressure in the lower branch 63 of the transducer output likewise decreases. The setting on the regulator 45 has determined the general cut-in point with specific variations determined by the bias spring in each of the differential pressure switches. As the force on each of the differential pressure switches equalizes, the contacts of the switches close. Since it is preferred that the pump stop after the closing of the gas valve 11 but before the stopping of the dasher motor 25, the contacts will close on the differential pressure switch 51 earlier during the falling of the load current than will the contacts of the switch 55.

When the differential pressure switch 51 closes its contacts, the pump 5 is stopped and the air valve 17 is closed. The dasher motor continues to operate the dasher. No new refrigerant flows into the freezer tube and no new mix is pumped into the freezer tube. As the mix retained in the freezer tube becomes less stiff as it absorbs heat, the load current on the dasher motor decreases. When the load current reaches the cut-in point on the differential pressure switch 55, the contacts of the switch close and the dasher motor is stopped. Thus, the entire freezer is stopped and freeze-up in the freezer tube is avoided. Upon subsequent restarting, the dasher 23 can immediately begin agitation of the mix.

When restarting the freezer 6, it is desirable to avoid exiting the soft ice cream that is in the freezer tube 7. Thus, the pump 5 does not start until the dasher motor load builds up to a predetermined value, to permit desirably firm ice cream. In this connection, the differential pressure switch 53 is used. Whereas in the instance of the differential pressure switches 51, 55, the contacts are open when the dasher motor load is above the predetermined value of their respective load cut-in points, in the instance of the differential pressure switch 53, the contacts are open when the dasher motor load is below the predetermined value of its load cut-in. Thus, initially the pump motor does not start.

In restarting the freezer 6 to resume freezing, the automatic start switch 35 is first actuated. This stops the running of the elapsed time meter 39, and the amount of time that the freezer 6 has been stopped can be seen. The elapsed time meter is reset manually. As will be seen hereinafter in connection with the description of the control circuit, the actuation of the automatic start switch sets up the circuit conditions for a predetermined schedule of automatic starting. This predetermined schedule is not initiated, however, until the manual start switch 37 is actuated. It will be seen subsequently that in a freezer system having a plurality of freezer tubes, there is a manual start switch for each freezer tube in the system. Thus, less than all of the freezer tubes in the system may be operated merely by not actuating certain manual switches.

When the manual start switch 37 is actuated the dasher motor 25 is started and the solenoid 15 is energized to open the gas valve 11. Thus, agitation of the mix in the freezer tube 7 is started and the flow of the refrigerant in the hollow tube 8 is started. As the cooling of the mix proceeds, the stiffness increases and the dasher motor load current increases. When the dasher motor load reaches the load cut-in of the differential pressure switch 53, its contacts close to start the pump 5 and to energize the mix air solenoid 21, which opens the air valve 17. Production of the ice cream is resumed.

While certain features of the present invention have been described in connection with pneumatic devices operating on the output of a transducer, one skilled in the art will appreciate that the invention need not be limited to pneumatic devices. For example, well-known electromechanical relay circuitry could be employed in which conventional differential relays function when voltage, current or power differences between their windings reach a predetermined value. Further, solid state circuitry employing transistors, diodes, resistors, and capacitors in a variety of circuit packages could be used to accomplish these control functions.

As mentioned previously, it is undesirable to allow the dasher to run an undetermined period of time after the refrigerant flow has been stopped because of the texture acquired. Moreover, a long dasher run may result in variations in overrun and, hence, upsets in the weights of the ice cream packages. Hence, it is preferred that the dasher operate only long enough to avoid dasher freeze-up. Because the conditions of both the equipment and the mix vary and it is difficult to ascribe a precise time to this shut down, the foregoing described features of the present invention acquire significance. Having described the details of the operation of a freezer with a single freezer tube, attention may now be given to a freezer system having a plurality of freezer tubes. Such is the freezer 6ab illustrated in FIG. 3. In this figure, the same reference numerals are used for the various components of the freezer as were described in detail in connection with FIG. 1. The subscript a has been added to the reference numerals for like components of a second freezer tube and its associated parts, and the subscript b has been added to the numerals of like components of a third freezer tube and its associated parts. Thus, one freezer system employing a compresser 14 and a condenser 16 is seen in FIG. 3 for supplying refrigerant to the freezer tubes 7, 7a, and 7b. Each of the freezer tubes has associated therewith a pump, a dasher, a dasher motor, an air valve, a refrigerant line valve, and valve operating solenoids.

The central control panel 31ab contains all of the electrical circuitry and the associated control components. A single elapsed time meter 39, an emergency stop switch 33 and an automatic stop switch 35 are common to the freezer system. The manual start switches 37, 37a and 37b are provided for each freezer tube of the system. In like manner, there are indicating meters 57, 57a and 57b and associated adjusting knobs 47, 47a and 47b. There are also transducers 43, 43a and 43b and associated pneumatic circuits for each of the freezer tubes.

It has been noted that the cut-in points for each of the freezer tubes can be adjusted separately and independently of each other. The stop schedule of the freezer is initiated by the actuation of the emergency stop switch 33. Immediately the elapsed time meter 39 starts and the solenoids 15, 15a, and 15b are deenergized to permit the closing of their respective associated valves in the refrigerant lines to stop the refrigerant flow in each of the freezer tubes 7, 7a, and 7b. After a few seconds, the load current of each of the dasher motors 25, 25a, and 25b begins to decrease. Depending upon the cut-in points, the differential pressure switches 51, 51a, and 51b will close their respective contacts to stop their associated pumps 5, 5a, and 5b and close the air valves 17, 17a, and 17b. As the load currents continue to decrease, the differential pressure switches 55, 55a, and 55b close their respective contacts to stop their associated dasher motors. Although the stopping of the pumps and the dasher motors for each of the freezer tubes follows the same sequence, the time intervals may vary between the tubes according to the load cut-in points.

To restart the freezer 6ab and to resume freezing in the freezer tubes, the automatic start switch 35 is actuated. This stops the running of the elapsed time meter, which must be reset manually. Further, the automatic sequence for the starting schedule is set up in the control circuit, but the actual starting of the separate pumps and dashers does not occur until the manual start swiches 37, 37a, and 37b are each separately actuated. As each manual start switch is actuated, the dasher motor of its associated circuit is started and the associated solenoid is energized to open its gas valve.

The differential pressure switches 53, 53a, and 53b are used in the start schedule. Initially, the contacts of these switches are open and remain open as long as the dasher motor load is below the predetermined value of each load cut-in. As the dasher motor of a particular freezer tube reaches each load cut-in, the contacts of the associated switch close, starting the pump motor of the associated freezer tube and energizing the associated solenoid to open its air valve. Here again, the sequence in the start schedule is the same for all tubes, but the time intervals between steps may differ because of the characteristics of the mixes and because of the possible differences in settings. Thus, the start of the freezer 6ab permits a schedule for each of its freezer tubes according to the individual requirements of the freezer tube and the type of mix being frozen in that particular freezer tube.

The electrical schematic in FIG. 2 sets forth a circuit that may be used to effect the controlled sequences of stopping and subsequently restarting the freezers 6 and 6ab. L1 and L2 represent a source of suitable alternating current voltage for the control circuit. All of the components are depicted in their normal position, i.e. the deenergized or non-operated position. For ease of illustration and description, certain electrical components familiar to one skilled in the art have been omitted. These are components such as a main power switch, indicating lamps, overload devices, fuses, and switches for manual operation of individual components, all of which are not necessary to an understanding of the invention.

At any time the main power is applied to the control circuit, one of two relays is energized. An Off relay R1 is energized when the freezer is stopped. An On Relay R2 is energized, and the Off relay R1 is deenergized when the freezer is operated. For purposes of description, assume first that the freezer is operating and that ice cream mix is being frozen in the freezer tube 7. Accordingly, the On relay R2 is energized, the pump motor starter PMSI is energized, the mix air solenoid 21 is energized, the dasher motor starter DMSI is energized, and the refrigerant valve solenoid 15 is energized. Upon actuating the emergency stop switch 33, the Off relay R1 is energized by the closing of the normally open contacts of the emergency stop switch, and the On relay R2 is deenergized by the opening of the normally closed contacts of the emergency stop switch. When the Off relay R1 is energized, its holding contacts R1–1 close to maintain the relay in the energized condition through the normally closed contacts of the automatic start switch 35. Another set of contacts R1–2 close to start the running of the elapsed time meter 39. A further set of contacts R1–5, at the lower portion of the schematic, close to apply power to a timer relay TD4. Relay contacts TD4–1 are immediately opened and remain open for the duration of timing, which is a few seconds.

It will be recalled that one of the initial conditions of the circuit is that the refrigerant valve solenoid 15 is energized. This condition occurs because a control relay CR1 is energized and its contacts 1CR1 are closed. Thus, with the opening of the TD4–1 contacts, the control relay CR1 is deenergized and its contacts 1CR1 are open. This in turn causes the solenoid 15 to be deenergized, which allows the closing of the refrigerant valve 11 to stop the flow of refrigerant in the system. Because the contacts 1CR1 are open, the relay CR1 will remain deenergized until restarting, even though the contacts TD4–1 close after a few seconds.

Figure 2:
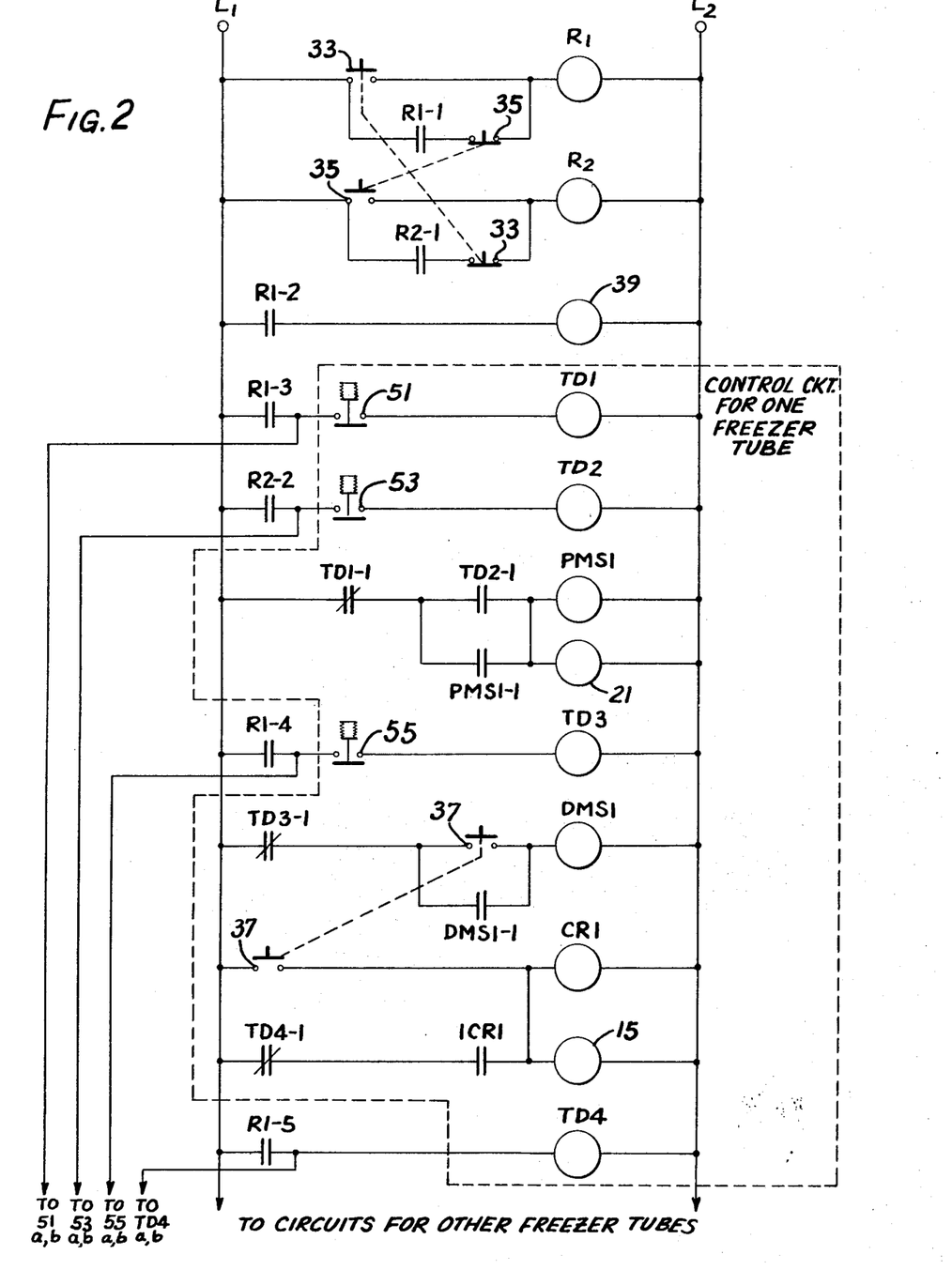
FIG. 2 is an electrical schematic circuit diagram of a basic control circuit for a freezer according to a preferred embodiment of the present invention.

At this point it should be noted that all of the circuitry within the dasher line of FIG. 2 is related to a specific freezer tube. Thus, for the freezer 6ab, which has aplurality of freezer tubes, there must be a like portion of this control circuit enclosed within the dashed lines for each freezer tube. Electrical interconnections for these duplicated portions are indicated by the six lines with arrows. Thus, when the Off relay R1 is energized and its contacts R1–5 are closed, not only is the timer relay TD4 activated but also the corresponding timer relays in the duplicated portions of the control circuit for the additional freezer tubes.

A further set of closed contacts R1–3 potentially connects power to a timer relay TD1. Intervening contacts of the differential pressure switch 51, however, prevent the timer relay TD1 from energizing as long as the dasher motor load current is above the predetermined value set on the load cut-in. When the dasher motor load decreases to the cut-in point, the differential pressure switch 51 closes its contacts and the timer relay TD1 is activated to immediately open its contacts TD1-1 while timing, which is a duration of approximately three seconds. Since the pump motor starter PMS1 was initially energized, its holding contacts PMS1-1 are closed to maintain power to the starter. Thus, when TD1-1 contacts momentarily open, power is removed from the starter and its contacts PMS1-1 open. This action also deenergizes the mix air solenoid 21, which permits the spring operated valve 17 in the air line to close.

A last set of contacts $R_L$-4 are also closed when the Off relay R1 is energized. These contacts potentially connect power to a timer relay TD3. The open intervening contacts of the differential pressure switch 55 prevents the relay from energizing at this time. It will be recalled that by means of the bias spring, the contacts of the differential pressure switch 55 close at an interval of time subsequent to the closing of the contacts of the differential pressure switch 51. When the decreasing dasher motor current reaches the cut-in point of the switch 55, its contacts then close and power is applied to the timer relay TD3. The contacts TD3-1 of this timer relay immediately open and remain open during the timing of the relay, which is approximately for three seconds. The dasher motor starter DMS1 has been maintained energized through its holding contact DMS1-1. Thus, when the normally closed contacts TD3-1 open, power is removed from the dasher motor starter and the dasher motor stops.

As noted previously in the instance of contacts R1-5, as the contacts R1-3 and R1-4 close to supply power to the timer relays TD1 and TD3 respectively, they also supply power to corresponding timer relays in the duplicated portions of the control circuit for the additional freezer tubes.

To restart the freezer to resume freezing the automatic start switch 35 is first actuated. As can be seen near the top of the schematic of FIG. 2, the normally closed contacts of the switch 35 remove power from the Off relay R1 when the switch is actuated, and the normally open contacts of the switch 35 apply power to the On relay R2 when the switch is actuated. Thus, the Off relay R1 is deenergized and the On relay R2 is energized. The contacts R1-2 of the Off relay R1 also open upon the deenergizing of the Off relay and remove power from the elapsed time meter 39 to stop the timing. This time meter 39 must be reset manually to be in readiness for the next stop period of the freezer. The contacts R1-3, R1-4, and R1-5 of the Off relay also open to remove power from their associated timer relays. Unlike the elapsed time meter 39, the timer relays TD1, TD3, and TD4 reset in preparation for a new timing cycle upon the removal of voltage from their respective coils.

Upon power being applied to the On relay R2, its holding contacts R2-1 close to maintain the relay in the energized condition until a subsequent actuation of the emergency stop switch 33. Another set of contacts, R2-2 are also closed to potentially apply power to a timer relay TD2. The intervening contacts of the differential pressure switch 53, however, prevent power from being applied to the relay initially. It will be recalled that the contacts of this differential switch are open as long as the dasher motor load is below the predetermined values set on the load cut-in. Since the dasher motor has not yet started, the contacts of the differential presure switch are open. It will be noted that the automatic start schedule for the freezer has been set up by the actuation of the automatic start switch 35 even though the dasher motor has not been started. The contacts R2-2 also apply voltage to the differential pressure switches of the duplicate portions of of the control circuit for the additional freezer tubes.

To start the dasher motors of the freezer tubes, each manual start switch 37, 37a, and 37b must be separately actuated. As can be seen in the lower portion of the schematic of FIG. 2 when the start switch 37 is actuated, one set of its normally open contacts applies power to the dasher motor starter DMS1. This starter's holding contacts DMS1-1 then close to maintain power on the starter. Another set of normally open contacts of the start switch 37 applies power to the control relay CR1 and the solenoid 15. When both of these are thus energized, the holding contacts 1CR1 of the control relay maintain voltage to both the control relay CR1 and the solenoid 15. Energizing the solenoid 15 opens the refrigerant valve 11 and the refrigerant starts again to flow in the freezer system. In like manner, the actuation of the start switches 37a, and 37b start their associated dasher motors and open their associated refrigerant valves.

With the refrigerant flowing in each system and the dasher motors agitating the mix, the stiffness of the ice cream mix in each freezer tube begins to increase. The resulting increase in the dasher motor loads, as previously described, affects the pneumatic differential circuit, and when the motor load reaches the cut-in points of each of the differential pressure switches 53, 53a, and 53b, each set of switch contacts close to apply power to the timer relays TD2, TD2a, and TD2b, respectively. As seen in respect to the single freezer tube schematic of FIG. 2, when the timer TD2 is activated its contacts TD2-1 are closed during the timing, which is for approximately three seconds. This action applies power to the pump motor starter PMS1 and the solenoid 21, which opens the valve 17 in the air supply. The holding contacts PMS1-1 of the pump motor starter close to maintain power across the starter and the solenoid. In like manner, the pump motor starters and solenoids of the other freezer tubes are energized.

Thus, there has been provided a method, apparatus, and control circuitry for a single freezer system having a plurality of freezing tubes in which a schedule for actuating the stopping and starting of the pumps and the dashers associated with each freezer tube can be adjusted to meet the individual requirements of each freezer tube and the type of mix being frozen therein. The entire control is operable from a central operating station. For convenience, this station may be near the packaging line at the output of the freezer tubes. Although for the purposes of description, a single freezer tube and three freezer tubes on a single freezer system have been illustrated herein, there is no intention to limit the invention to a freezer having specific number of freezer tubes. The selection was arbitrary for purposes of description and illustration only.

Thus it is apparent that there has been provided, in accordance with the invention, a method and apparatus for controlling freezers that fully satisfies the objects, aims, and advantages set forth above. While the invention has been described in connection with a specific embodiment thereof, it is evident that many alternatives, modifications, and variations will be apparent to those skilled in the art in view of the foregoing description. Accordingly, it is intended to embrance all such alternatives, modifications, and variations that fall within the spirit and scope of the appended claims.

What is claimed is:

1. Apparatus for effecting quick stopping of a product freezer while preserving the immediate usefulness of the product mix being frozen, the stopping occurring in response to the stiffness of the mix, the apparatus comprising: a refrigeration system, a freezer tube in said system for congealing the product mix therein, a dasher within said freezer tube for agitating the product mix and for scraping the inside walls of said freezer tube during the cooling of the mix, motor means for driving said dasher, a pump for supplying the product mix to said freezer tube, means for stopping the flow of the refrigerant in said system, means for measuring the load on said dasher motor means, means for transmitting a first signal to said pump when the load on said dasher motor means reaches a first predetermined value as determined by said measuring means, means for stopping said pump in response to said first signal, means for transmitting a second signal to said dasher motor means when the load thereon reaches a second predetermined value as determined by said measuring means, and means for stopping said dasher motor means in response to said second signal.

2. The apparatus recited in claim 1 wherein said measuring means includes adjustable reference means for separately setting the predetermined values of said dasher motor means load at which each of said signals will be transmitted.

3. The apparatus recited in claim 2 wherein said reference means includes transducer means to receive power from said dasher motor means and to supply power to a differential means.

4. The apparatus recited in claim 3 wherein said transducer means receives power in the form of electric signals and transmits power in the form of pneumatic pressure signals to a pneumatic circuit, the magnitude of pneumatic pressure signals being proportionate to the magnitude of the electrical signals, and wherein said pneumatic circuit includes adjustable regulator means for setting the values of said dasher motor means load at which each of said signals will be transmitted.

5. The apparatus recited in claim 1 for also effecting rapid starting of a product freezer, further comprisng: means for starting said dasher motor means and means for substantially simultaneously starting the flow of refrigerant during starting of the freezer, means for transmitting a third signal to said pump when the load on said dasher motor means reaches a third predetermined value as determined by said measuring means, and means for starting said pump in response to said third signal.

6. Apparatus for effecting quick starting of a product freezer while preserving the immediate usefulness of the product mix being frozen, the starting occurring in response to the stiffness of the mix, the apparatus comprising: a refrigeration system, a freezer tube in said system for congealing the product mix therein, a dasher within said freezer tube for agitating the product mix and for scraping the inside walls of said freezer tube during the cooling of the mix, motor means for driving said dasher, a pump for supplying the product mix to said freezer tube, means for starting said dasher motor means and means for substantially simultaneously starting the flow of the refrigerant in the system during starting of the freezer, means for measuring the load on said dasher motor means, means for transmitting a signal to said pump when the load on said dasher motor means reaches a predetermined value as determined by said measuring means, and means for starting said pump in response to said signal.

7. The apparatus recited in claim 6 wherein said measuring means includes adjustable reference means for adjusting the predetermined value of said dasher motor means load at which said signal will be transmitted.

8. The apparatus recited in claim 7 wherein said reference means includes transducer means to receive power from said dasher motor means and to supply power to a differential means.

9. The apparatus recited in claim 8 wherein said transducer means receives power in the form of electric signals and transmits power in the form of pneumatic pressure signals to a pneumatic circuit, the magnitude of the pneumatic pressure signals being proportionate to the magnitude of the electrical signals, and wherein said pneumatic circuit includes adjustable regulator means for setting the value of said dasher motor means load at which said signal will be transmitted.

10. Apparatus for effecting quick stopping of a product freezer while preserving the immediate usefulness of the product being frozen, the freezer having a plurality of freezer tubes for freezing separate product mixes at one time, the stopping of each tube being separately adjustable to occur in response to the stiffness of the product mix therein during the stopping of the freezer, the apparatus comprising: a refrigeration system; a plurality of freezer tubes in said system for congealing the product mixed therein; a dasher within each of said plurality of freezer tubes for agitating the product mixes and for scraping the inside walls of said plurality of freezer tubes during the cooling of the mixes; motor means on each of said dashers for driving said dashers; a pump for each of said plurality of freezer tubes to supply the product mix to said tubes, means for stopping the flow of the refrigerant in the system to each of said plurality of freezer tubes separately; means for measuring the load on each of said dasher motor means separately; means for transmitting a first signal to each of said pumps separately when the load on each of said dasher motor means reaches a first predetermined value as determined respectively by the measuring means associated therewith; means for stopping each of said pumps separately in response to said first signal related thereto; means for transmitting a second signal to each of said dasher motor means separately when the load thereon reaches a second predetermined value as determined respectively by the measuring means associated therewith; and means for stopping each of said dasher motor means separately in response to said second signal related thereto.

11. The apparatus recited in claim 10 wherein said measuring means includes adjustable reference means for separately setting the predetermined values of each of said dasher motor means loads at which each of said signals will be transmitted.

12. The apparatus recited in claim 11 wherein said reference means includes transducer means for each of said dasher motor means, each transducer to receive power from the dasher motor means associated therewith and to supply power to differential means associated with each of said dasher motor means.

13. The apparatus recited in claim 12 wherein each of said transducer means receives input power in the form of electrical signals and supplies output power in the form of pneumatic pressure signals to a pneumatic circuit associated therewith, the magnitude of the pneumatic pressure signals being proportionate to the magnitude of the electrical signals, and wherein each of said pneumatic circuits includes adjustable regulator means for setting the values of the dasher motor means load associated therewith at which each of said signals will be transmitted.

14. The apparatus recited in claim 10 for also effecting rapid starting of a product freezer, further comprising: means for starting each of said dasher motor means separately and means for substantially simultaneously starting the flow of refrigerant in the system to each freezer tube corresponding thereto separately during starting of the freezer; means for transmitting a third signal to each of said pumps separately when the load on the dasher motor means associated with each pump reaches a third predetermined value as determined respectively by the measuring means associated therewith, and means for starting each of said pumps separately in response to said third signal related thereto.

15. Apparatus for effecting quick starting of a product freezer while preserving the immediate usefulness of the product being frozen, the freezer having a plurality of freezer tubes for freezing separate product mixes at one time, the starting of each tube being separately adjustable to occur in response to the stiffness of the product mix therein during the starting of the freezer, the apparatus comprising: refrigeration system; a plurality of freezer tubes in said system for congealing the product mixes therein; a dasher within each of said plurality of freezer tubes for agitating the product mixes and for scraping the inside walls of said plurality of freezer tubes during the cooling of the mixes, motor means on each of said dashers for driving said dashers; a pump for each of said plurality of freezer tubes to supply the product mix to said tubes; means for starting the flow of refrigerant in the system to each of said plurality of freezer tubes separately and means for starting separately the dasher motor means associated therewith substantially simultaneously with the starting of the related refrigerant during starting of the freezer; means for measuring the load on each of said dasher motor means separately; means for transmitting a signal to each of said pumps separately when the load on the dasher motor means associated with each pump reaches a predetermined value as determined respectively by the measuring means associated therewith; and means for starting each of said pumps separately in response to said signal related thereto.

16. The apparatus recited in claim 15 wherein said measuring means includes adjustable reference means for separately setting said predetermined value of each of said dasher motor means loads at which each of said signals will be transmitted.

17. The apparatus recited in claim 16 wherein said reference means includes transducer means for each of said dasher motor means, each transducer to receive power from the dasher motor means associated therewith and to supply power to differential means associated with each of said dasher motor means.

18. The apparatus recited in claim 17 wherein each of said transducer means receives input power in the form of electrical signals and supplies output power in the form of pneumatic pressure signals to a pneumatic circuit associated therewith, the magnitude of the pneumatic pressure signals being proportionate to the magnitude of the electrical signals, and wherein each of said pneumatic circuits includes adjustable regulator means for setting the value of the dasher motor means load associated therewith at which said signals will be transmitted.

19. A method of effecting quick stopping of freezer apparatus while preserving the immediate usefulness of the product mix being frozen, the stopping occurring in response to the stiffness of the mix, the apparatus including a refrigeration system, at least one freezer tube in said system for congealing the product mix in said freezer tube, a dasher within said freezer tube for agitating the product mix and for scraping the inside walls of said freezer tube during the cooling of the product mix, motor means for driving said dasher, a pump for supplying the product mix to said freezer tube, control means for said apparatus, and means for providing signals in said control means, comprising the steps of: measuring the load on said dasher motor means, stopping the flow of the refrigerant in said refrigeration system when stopping the apparatus, transmitting a first signal to said pump when the load on said dasher motor means reaches a first predetermined value after said stopping of the refrigerant flow, transmitting a second signal to dasher motor means when the load thereon reaches a second predetermined value after said stopping of the refrigerant flow, stopping said pump in response to said first signal, and stopping said dasher motor means in response to said second signal.

20. The method recited in claim 19 in which the apparatus further includes an adjustable reference means for each of said predetermined values and wherein said transmitting of each of said signals includes the steps of: setting said reference means for each of said predetermined values, comparing said dasher motor means load to each of said set references, and transmitting each of said signals when said dasher motor means load substantially reaches each of said set references.

21. The method recited in claim 19 for also effecting rapid starting of freezer apparatus, further comprising the steps of: starting the flow of the refrigerant when starting the apparatus, starting said dasher motor means substantially simultaneously with said starting of the refrigerant flow, transmitting a third signal to said pump after said dasher motor means starting when the load on said dasher motor means reaches a third predetermined value, and starting said pump in response to said third signal.

22. A method of effecting quick starting of freezer apparatus while preserving the immediate usefulness of the product mix being frozen, the starting occurring in response to the stiffness of the mix, the apparatus including a refrigeration system, at least one freezer tube in said system for congealing the product mix in said freezer tube, a dasher within said freezer tube for agitating the product mix and for scraping the inside walls of said freezer tube during the cooling of the product mix, motor means for driving said dasher, a pump for supplying the product mix to said freezer tube, control means for said apparatus, and means for providing signals in said control means, comprising the steps of: starting the flow of the refrigerant when starting said apparatus; starting said dasher motor means substantially simultaneously with said starting of the refrigerant flow, measuring the load on said dasher motor means, transmitting a signal to said pump when the load on said dasher motor means reaches a predetermined value, and starting said pump in response to said signal.

References Cited

UNITED STATES PATENTS

| | | | |
|---|---|---|---|
| 3,608,325 | 9/1971 | Hock | 62—70 |
| 3,075,480 | 1/1963 | Berg | 62—136 A |

WILLIAM E. WAYNER, Primary Examiner

W. E. TAPOLCAI, Jr., Assistant Examiner

U.S. Cl. X.R.

62—136, 179